United States Patent
Randle

[15] 3,703,301
[45] Nov. 21, 1972

[54] TRAILER HITCH
[72] Inventor: Dee Randle, Ennis, Tex.
[73] Assignee: Swan Trailers Inc., Garland, Tex.
[22] Filed: Feb. 12, 1971
[21] Appl. No.: 114,836

[52] U.S. Cl. ...................280/438, 280/423, 280/504
[51] Int. Cl. ...........................................B62d 53/00
[58] Field of Search.......................220/423, 438, 504

[56] References Cited

UNITED STATES PATENTS

| | | | |
|---|---|---|---|
| 3,406,852 | 10/1968 | Winckler | 280/438 R X |
| 2,393,016 | 1/1946 | Black | 280/423 B X |
| 2,425,521 | 8/1947 | Ellberg | 280/438 R |
| 3,433,503 | 3/1969 | Davis | 280/423 R |
| 2,581,833 | 1/1952 | Boivin | 280/504 |
| 3,336,050 | 8/1967 | Dale | 280/423 R |
| 3,336,051 | 8/1967 | Dale | 280/423 R |

*Primary Examiner*—Leo Friaglia
*Attorney*—Merchant & Gould

[57] ABSTRACT

An inverted generally U-shaped tongue affixed to the front end of a trailer with the forward downwardly directed end thereof having a downwardly directed opening therein and an upwardly projecting member affixed generally centrally in a truck body, which member is constructed to be received within the opening in the tongue, said tongue and member having transverse, aligned openings therethrough with a pin receivable therein. A jack is incorporated in the front end of the trailer to raise and lower the tongue to disengage and engage it with the member mounted in the truck box.

4 Claims, 3 Drawing Figures

PATENTED NOV 21 1972 3,703,301

INVENTOR.
DEE RANDLE
BY Merchant & Gould
ATTORNEYS

TRAILER HITCH

BACKGROUND OF THE INVENTION

1. Field of the Invention

The present invention pertains to a trailer hitch wherein a relatively heavy two-wheel trailer is hitched to a draft device, such as a pick-up truck or the like. Exceptionally heavy trailers, or trailers with large loads thereon, are difficult to trail because of the excessive weight placed on the rear of the draft vehicle. Because a substantial portion of the weight of the trailer and load thereon, for two-wheel trailers, is on the tongue of the trailer, this weight is transferred to the rear of the draft vehicle and produces poor performance and excessive wear of the draft vehicle.

2. Description of the Prior Art

All known prior art attaches to a draft bar at the rear of the draft vehicle. When the draft vehicle is a pick-up truck or the like the rear of the truck is substantially behind the rear axle so that there is a tendency to pivot the front end of the truck upwardly about the rear axle. Although a variety of safety hitches and the like have been devised, no known hitch is constructed which solves the problem of imbalance on a draft vehicle.

SUMMARY OF THE INVENTION

The present invention pertains to an improved trailer hitch wherein one end of an inverted generally U-shaped tongue is affixed to the front end of a trailer and the opposite end, having a downwardly directed opening therein, is spaced forwardly therefrom. An upwardly projecting member designed to be received within the opening in the tongue is attached to a central portion of the box of a pick-up truck or the like so that it is free to pivot a limited amount. Transverse openings through the tongue and the upwardly projecting member are aligned when the tongue is properly positioned over the upwardly projecting member and a pin engaged therethrough fixedly attaches the trailer to the truck.

It is an object of the present invention to provide an improved trailer hitch.

It is a further object of the present invention to provide an improved trailer hitch wherein the weight of the trailer is placed on or near the rear axle of the draft means.

It is a further object of the present invention to provide an improved trailer hitch which allows the draft means to turn in a substantially sharper turn without engaging or damaging the trailer.

These and other objects of the present invention will become apparent to those skilled in the art upon consideration of the accompanying specification, claims and drawings.

BRIEF DESCRIPTION OF THE DRAWINGS

Referring to the drawings, wherein like characters indicate like parts throughout the figures.

DESCRIPTION OF THE PREFERRED EMBODIMENT

Figure 1:
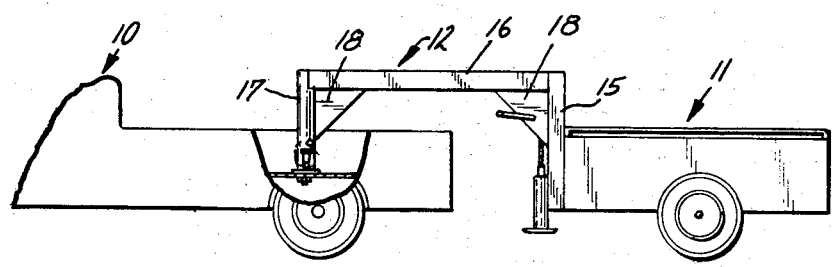
FIG. 1 is a view in side elevation of a trailer having the improved trailer hitch affixed thereto and attached to a pick-up truck, portions thereof broken away.

In the figures the numeral 10 designates a draft device, which in this embodiment is a pick-up truck. The numeral 11 generally designates a two-wheel trailer having the present trailer hitch generally designated 12 affixed to the front end thereof. It should be understood that the specific draft device 10 and trailer 11 illustrated in this embodiment are for explanation only and it is believed that the present trailer hitch will operate with any of the great variety of draft devices and trailers known to those skilled in the art.

In the present embodiment of the hitch 12, a tongue for the trailer 11 is constructed by affixing a vertically upwardly extending member 15 to the front of the trailer with a horizontally forwardly extending member 16 affixed to the upper end of the member 15 and a vertically downwardly extending member 17 affixed to the forward end of the member 16. Fillets 18 are affixed in the corners of the adjoining members 15-16 and 16-17 to provide the required strength to the tongue. Thus, the members 15, 16 and 17 form an inverted generally U-shaped tongue which is affixed in forwardly extending relationship to the front of the trailer 11. In general, the members 15 and 17 extend vertically a sufficient distance to allow the lower end of the member 17 to rest on the bed of the truck 10 when the trailer 11 is approximately horizontal and to position the member 16 somewhat above the sides of the box of the truck 10. Further, the length of the member 16 is such that the trailer 11 is spaced sufficiently far behind the truck 10 with the member 17 resting on the bed of the truck 10 adjacent the rear axle.

Figure 2:
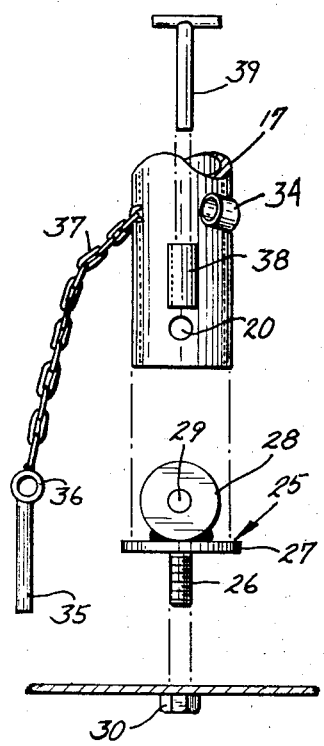
FIG. 2 is an enlarged exploded view in side elevation of a portion of the improved trailer hitch.

In the present embodiment the member 17 is formed from a tubular piece of material so that the lower end has a downwardly directed opening therein (see FIG. 2) and a transversely extending hole 20 is formed through the member 17 adjacent the lower end thereof. An upwardly projecting member, generally designated 25, is constructed in the following manner. A cylindrical body 26 having external threads, which body 26 may be a large bolt or the like, has a plate 27 affixed to the upper end thereof so as to lie in a plane perpendicular to the axis of the body 26. A second plate 28, constructed to be received within the downwardly directed opening in the member 17, is affixed to the upper surface of the plate 27 in upstanding relationship thereto. The plate 28 has a hole 29 therethrough, which hole 29 is axially aligned with the hole 20 when the plate 28 is positioned within the member 17 so that the lower edge of the member 17 rests on the plate 27. A nut 30 is fixedly attached to the underside of the bed of the truck 10 in alignment with a hole through the bed of the truck 10. The nut 30 is adapted to threadedly receive the body 26 of the upwardly projecting member 25 therein. To affix the upwardly projecting member 25 to the truck 10 the body 26 is simply threaded into the nut 30 until the plate 27 is approximately one thread from the upper surface of the bed of the truck 10. Thus, the upwardly projecting member 25 is free to pivot in at least a 180° horizontal arc about the axis of the body 26.

A first elongated pin 35 having an outer diameter slightly smaller than the inner diameter of the holes 20 and 29 through the member 17 and plate 28, respectively, has a ring 36 fixedly attached to one end thereof. A chain 37 affixed to the ring 36 by one end is affixed to the member 17 by the other end. A tubular element 38 is affixed to the outer surface of the member 17 so that the opening therethrough extends parallel with the axis of the member 17 and the lower end thereof is positioned directly above one of the holes 20. A second pin 39, having a generally T-shaped configuration, is constructed so that the main body thereof fits through the element 38 and the ring 36 on the pin 35. A second tubular element 34 is affixed to the outer surface of the member 17 for storing one of the pins 35 or 39.

Figure 3:
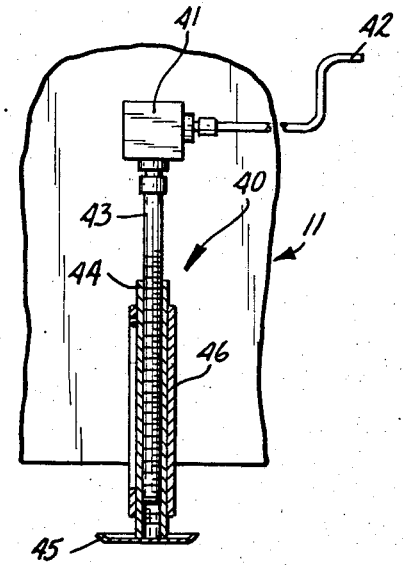
FIG. 3 is an enlarged fragmentary view of the jack associated with the trailer, portions thereof broken away.

A jack generally designated 40, illustrated in detail in FIG. 3, is affixed to the trailer 11 adjacent the front end thereof and utilized for raising and lowering the front end as well as balancing the trailer 11 when the truck 10 is removed from the hitch 12. The jack 40 includes a 90° drive gear unit 41 having a hand-crank 42 attached to an input shaft thereof and an externally threaded elongated shaft 43 extending vertically downwardly from the output thereof. An internally threaded tubular element 44 is engaged with the shaft 43 and has a ground engaging foot 45 affixed to the lower end thereof. The element 44 is slidably engaged in a tubular track 46 designed to allow vertical movement of the element 44 while preventing rotational movement thereof. Thus, rotation of the crank 42 produces rotation of the shaft 43 and consequent vertical movement of the element 44.

In operation of the disclosed hitch 12, the jack 40 is positioned so that the foot 45 is resting on the ground and the lower end of the member 17 is slightly higher than the plate 28 of the upwardly projecting member 25 when the member 25 is properly mounted in the bed of the truck 10. To connect the trailer 11 to the truck 10, the truck 10 is positioned so the member 17 overlies the upwardly projecting member 25 and the jack 40 is manipulated until the lower edge of the member 17 rests on the plate 27 with the plate 28 received within the member 17. The pin 35 is inserted through the holes 20 and 29 and the pin 39 is inserted through the tubular element 38 and ring 36 to lock the pin 35 in place. The jack 40 is then raised into a stored position with the foot 45 spaced a substantial distance from the ground, approximately as shown in FIG. 1. The truck 10 and trailer 11 are now ready for use and, because the member 17 rests on the truck bed adjacent the rear axle of the truck 10, rather than on the rear bumper or on a trailer hitch affixed to the rear of the truck, the weight of the trailer 11 is on the rear axle and more properly distributed over the truck 10. Further, because the upwardly projecting member 25 is free to rotate at least 180°, the trailer 11 follows the truck 10 properly and on a shorter turning base. Also, because the member 16 of the U-shaped tongue of the trailer 11 is sufficiently high to pass over the sides of the box of the truck 10, an operator can turn the truck 10 much sharper without damaging or engaging any portion of the trailer 11. Thus, the novel configuration of the hitch 12 provides greater flexibility and ease of manipulation of the truck 10 with the trailer 11 attached.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:

1. An improved trailer hitch comprising:
    a. a downwardly directed U-shaped tongue member, a first end portion of said tongue member having means for attachment to a trailer in forwardly spaced relationship therefrom and a second end portion of said tongue member being tubular with a downwardly directed opening, said second end portion having a generally horizontally extending opening of a first diameter extending therethrough;
    b. a plate member having means affixed thereto for attaching said plate member to a draft device for limited pivotal movement;
    c. an upwardly projecting member having a horizontally extending opening therethrough of a second diameter, said projecting member being attached to said plate member; and
    d. a pin having a third diameter which third diameter is smaller than said first diameter and said second diameter, said pin being insertable through said horizontally extending opening in said second end portion of said tongue member and through said horizontally extending opening in said projecting member for attaching said tongue member to said draft device.

2. The improved trailer of claim 1 wherein said upwardly projecting member comprises a circular plate.

3. The improved trailer hitch of claim 2 wherein said second end portion of said tongue member has a generally central axis through said downwardly directed opening, said axis extending through said opening in said projecting member and through said pin when said pin is inserted through said horizontally extending opening in said second end portion of said tongue member and through said horizontally extending opening in said circular plate.

4. The improved trailer hitch of claim 3 wherein said pin member defines an opening therethrough, said opening having an axis extending parallel with respect to said axis of said second end portion of said tongue member when said pin is inserted through said horizontally extending opening in said second end portion of said tongue member and through said horizontally extending opening in said circular plate, and including:
    a. a sleeve member attached to said second end portion of said tongue member and having an opening therethrough with an axis parallel with respect to said axis of said second end portion of said tongue member; and
    b. a second pin member insertable through said sleeve member opening and said opening within said first pin member for retaining said first pin member with respect to said second end portion of said tongue member and said circular plate.

* * * * *